Figure 3:
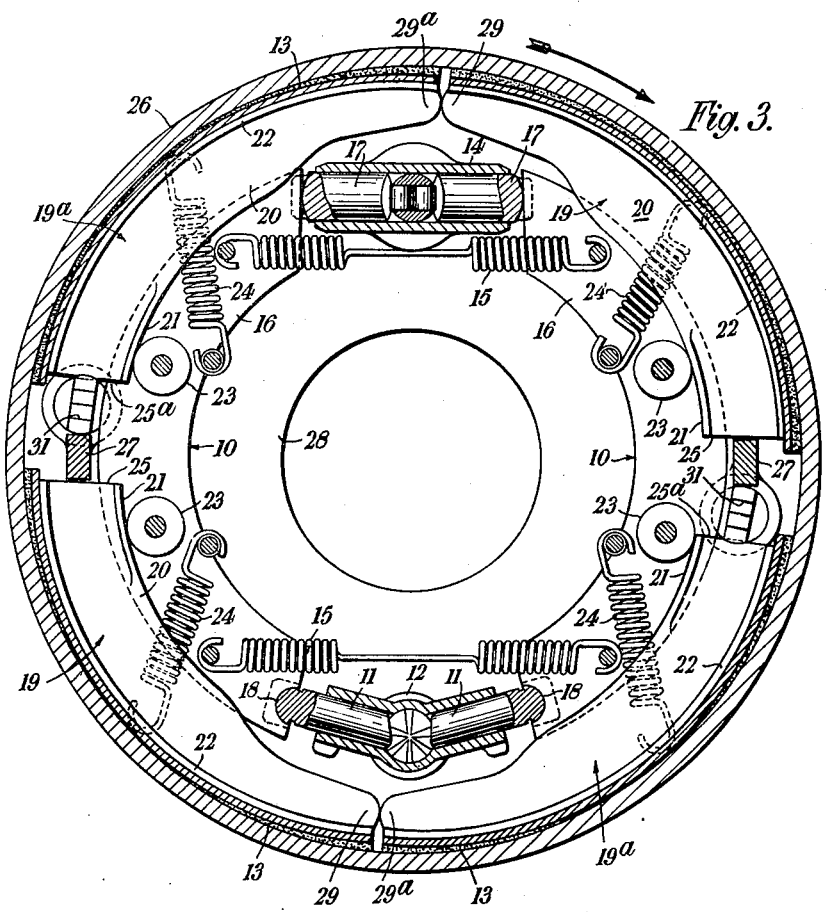

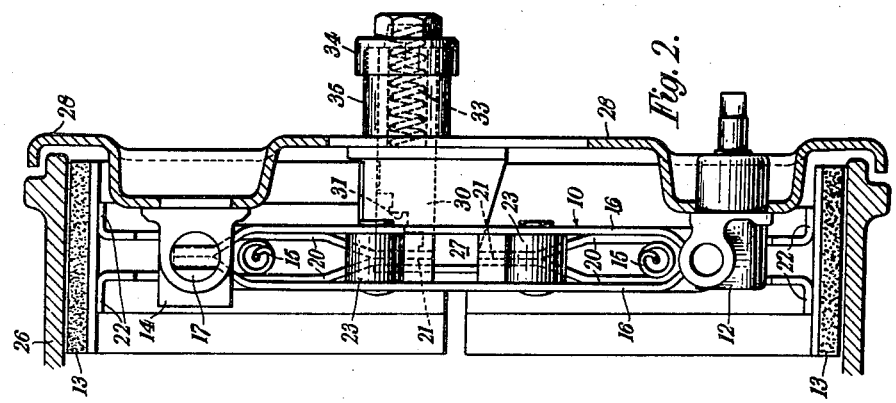
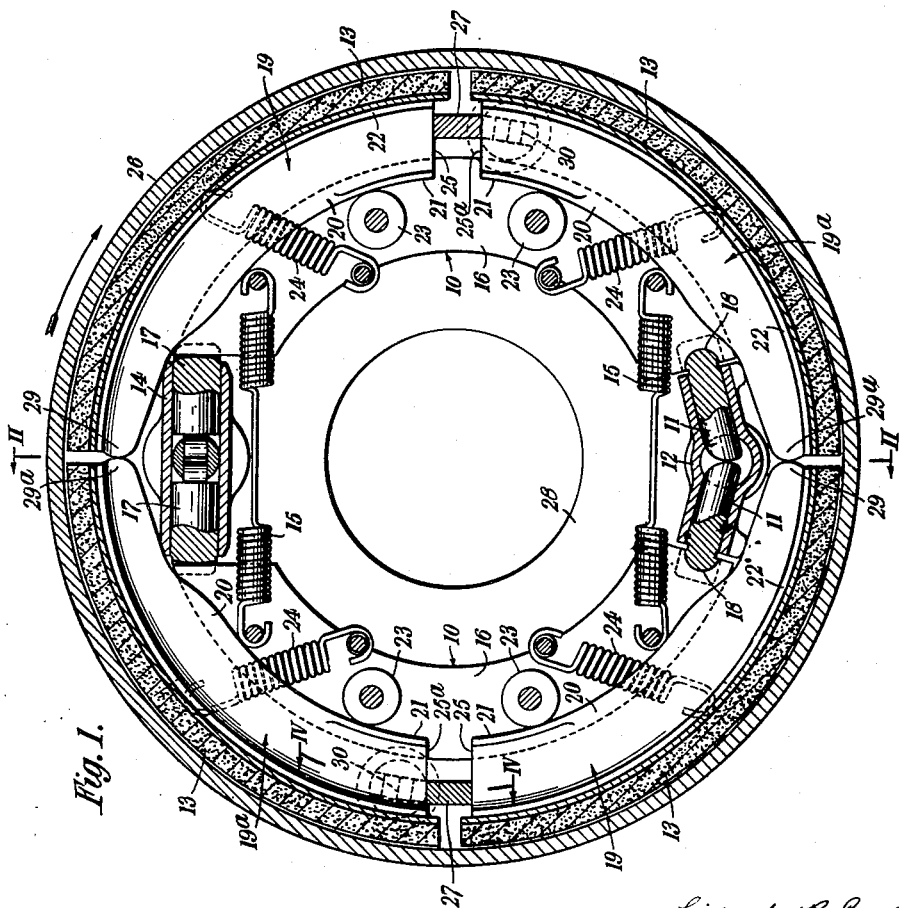

June 6, 1944.   F. R. COWELL   2,350,878
INTERNALLY EXPANDING BRAKE
Filed Aug. 20, 1942   3 Sheets-Sheet 2

Frederick R. Cowell
By
Watson, Cole, Grindle & Watson
ATTYS.

June 6, 1944.    F. R. COWELL    2,350,878
INTERNALLY EXPANDING BRAKE
Filed Aug. 20, 1942    3 Sheets-Sheet 3

Frederick R. Cowell
By
Watson, Cole, Grindle & Watson
ATTYS.

Patented June 6, 1944

2,350,878

UNITED STATES PATENT OFFICE 2,350,878

INTERNALLY EXPANDING BRAKE

Frederick Raymond Cowell, Leeds, England, assignor to Kirkstall Forge Limited, Leeds, England Application August 20, 1942, Serial No. 455,489
In Great Britain September 4, 1941

6 Claims. (Cl. 188—79.5)

This invention relates to self-energizing internally expanding brakes, of the type comprising a pair of brake-shoe-carriers, which are normally held inoperative and which move outwardly to apply the brake, brake shoes mounted on the carriers for limited circumferential movement in relation thereto when contacted by the revolving brake drum, and means for arresting the leading ends of the shoes and thereby producing an increased braking pressure.

In brakes of this type a single floating shoe may be used on each carrier, but it is preferred to have two shoes on each carrier in order to obtain a braking surface extending as nearly as possible around the whole periphery of the brake drum. In this latter case, it is sufficient to provide two stops located at diametrically opposite points, for arresting two of the shoes, the other shoes being arrested and having the additional braking pressure applied to them by the abutment of their leading ends on the trailing ends of the shoes arrested by the stops.

With such brakes, as the brake linings become worn, the clearances between the abutting ends of the shoes and between the shoes and the fixed stops increase, so that when the linings are nearly worn out, there is likely to be a considerable shock when the brakes are applied.

To avoid this disadvantage, the invention provides, in a brake of the above type, an automatic slack adjuster constituted by at least one spring-urged wedge member arranged to move progressively forwards, as the linings wear, to take up the resulting clearance between the shoes and the stop means, or between adjacent shoes.

In one construction according to the invention two fixed stops are provided, located at diametrically opposite points, and the slack adjuster consists of a pair of wedges, each of which is mounted adjacent to one of the fixed stops and is urged by a spring in the direction to increase the effective width of the stop. In this way the back-lash due to wearing of the linings is automatically taken up.

Where a pair of floating shoes is employed on each carrier, the wedges could, as an alternative, be located in the vicinity of the abutting ends of the shoes, so that they will gradually introduce themselves between the shoes as the linings wear. In this case, however, the wedges would have to be mounted so that they can float in relation to the back plate or other fixed part to which they are attached, and it is therefore preferred to dispose them in the vicinity of the fixed stops as stated above.

In an alternative arrangement, the stops, located at diametrically opposite points, are constituted by rotatably mounted snail cams spring urged in the direction to increase their effective width, the springs serving to turn the cams so as automatically to take up the clearance occasioned by wear of the linings.

In all of the constructions according to the invention, while the wedge members or snail cams operate automatically to take up the clearance occasioned by wear of the linings, they are nevertheless so designed as to leave the necessary small clearance required to enable the brake to be returned to the off position.

Figure 4:
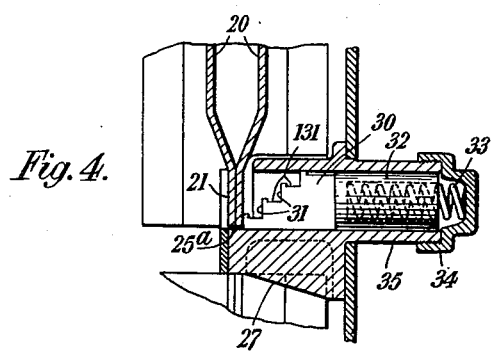
Figures 5, 6:
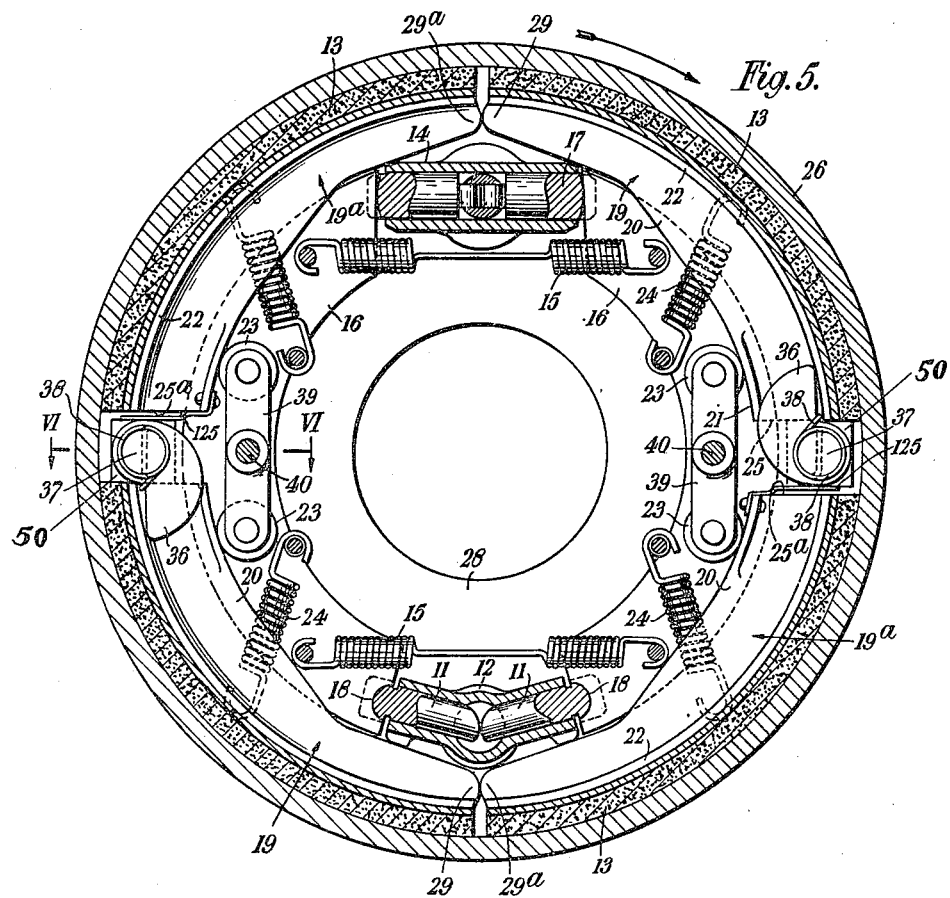

The invention is of particular application in conjunction with the brake described in the specification accompanying my copending application for Letters Patent No. 455,488, and two constructions of slack-adjuster for use with such a brake will now be described in further detail, by way of example, with reference to the accompanying drawings, in which Fig. 1 is a vertical section through the brake drum of the first arrangement, showing the brake off and with new linings, Fig. 2 is a section on the line II—II in Fig. 1, but showing the expander and brake adjuster in elevation, Fig. 3 is a sectional view similar to Fig. 1, but showing the brake on and the linings worn, Fig. 4 is a section on the IV—IV in Fig. 1, Fig. 5 is a sectional view, similar to Fig. 1, but with the brake on, showing the second arrangement, and Fig. 6 is a section on the line VI—VI in Fig. 5.

Like reference numerals indicate like parts throughout the figures.

Referring first of all to the arrangement shown in Figs. 1–4, the two carriers 10, which are of approximately semicircular form, are pivoted at one end on anchor pins 11 carried by a brake adjuster 12 which is operable, in known manner, and as described in United States Patent No. 2,271,815, to space the anchor pins further apart for the purpose of counter acting wear on the brake linings 13. Between the free ends of the carriers is arranged an expander 14, which is operable, also as described in Patent No. 2,271,815, to force the carriers outwardly about their pivots to apply the brake against the action of springs 15 interconnecting the carriers.

As shown in Fig. 2, each carrier 10 consists of two spaced plates 16, which are pinched together at their opposite ends to coact with the anchor pins 11 of the brake adjuster and with the plunger 17 of the expander. Each anchor pin 11 has a cylindrical head, formed with an axially extending groove, the inner edge of which is defined by the arcuate line 18, the end of the carrier, which is correspondingly slotted, being fitted into this groove. The plungers 17 of the expander are slotted to receive the ends of the carriers.

Each brake shoe is formed of a pair of spaced plates 20, located inside the plates 16 of the carrier. The plates 20 are pinched together at their inner ends at 21, and are outwardly flanged at their outer ends 22 to facilitate in the attachment of the lining. The inner portions 21 of the shoes coact each with a roller 23 mounted on the carrier, so as to permit the shoes to move circumferentially in relation to the carrier against the action of springs 24 connecting the shoes to the carrier. The adjacent ends 25, 25ª of the two shoes of each pair are located at about 90° from the expander 14, and it is these two ends which first make contact with the brake drum 26 on application of the brake. The rollers 23 are located in the neighbourhood of the adjacent ends of the shoes.

Between the adjacent ends 25, 25ª of the two shoes of each pair is located a fixed stop 27 attached to the back plate or anchor bracket 28 on the axle. This back plate carries the expander 14 and brake adjuster 12 as shown in Fig. 2.

When the brake shoes are contacted by the rotating brake drum 26 (which is assumed to be rotating in the direction of the arrow), they tend to move circumferentially in relation to the carriers, this movement causing the front end 25 of each trailing shoe 19 to abut against the fixed stop, and the front end 29ª of each leading shoe 19ª to abut against the rear end 29 of the trailing shoe 19 on the other carrier. The result is that the abutting ends 29, 29ª of the shoes, which are located respectively in the neighbourhood of the expander 14 and of the brake adjuster 12, are forced outwards into closer contact with the brake drum 26, thereby equalising the braking pressure between the shoes and the drum. It will be appreciated that this action will take place for both directions of rotation of the drum, so that when the brake is fitted to a road vehicle it will be equally effective whether the vehicle is travelling forwards or in reverse.

As the linings become worn, the clearance between the abutting ends 29, 29ª of the shoes and between the shoes and the fixed stops 27 increase, so that when the linings are nearly worn out, there is likely to be a considerable shock when the brake is applied.

To avoid this disadvantage an automatic slack adjuster is provided. This consists of a pair of wedges 30 each of which is mounted adjacent to one of the fixed stops 27. Each wedge has a stepped end, the steps being indicated by the reference numeral 31, and constitutes a forward prolongation of a plunger 32 (see Fig. 4) which is slidably mounted in a cylinder 35 formed as a unit with and extending rearwardly from the associated fixed stop 27. A spring 33, located in a recess in the plunger 32 and abutting against a screw cap 34 which closes the cylinder 35, tends to urge the wedge 30 in a forward direction.

When the linings are new, the end step 31 of the wedge 30 rests beneath the brake shoe adjoining the stop as shown in Fig. 4. As wear takes place, the wedge is forced forwards by the spring 33 until the end step can move into position between the fixed stop 27 and the end 25ª of the adjoining shoe, so increasing the effective width of the fixed stop and taking up slack. After more wear has taken place, the next step comes into operation and so on, until the linings are completely worn, when the last step has come into operation and the whole width of the plunger is utilized to take up the slack between the shoe and the fixed stop, as shown in Fig. 3. The riser portion of each step 31, which is of greater depth than the thickness of the flattened portion 21 of the shoe, is cut away, as indicated at 131, and as the wedge moves forward to introduce a new step between the stop 27 and the shoe, the end 25ª of the shoe will consequently slip into the recess 131. The wedge will move forward to take up the slack while the brake is on, and the small clearance between the wedge and the shoe then provided by the recess 131, will be sufficient to permit the shoes being moved to the off position by the springs 15.

In the alternative construction shown in Figs. 5 and 6, the arrangement is generally the same except that the stops are constituted by blocks 50 mounted on pins 37 fixed to the back plate 28. On each pin 37 is rotatably mounted a snail cam 36. A helical spring 38, one end of which is tucked rearwardly into a hole in the pin 37 and the other end of which engages under the nose of the snail cam 36, tends to turn the latter in the counterclockwise direction as viewed in Figure 5, so as to bring a wider portion of the cam into the space between the block 50 and the end 25ª of the shoe 19ª, in this way automatically taking up the slack as the linings wear.

On the rear end 25ª of each trailing shoe 19ª is mounted a leaf spring 125, which, being more powerful than the helical spring 38, lies parallel to the end of the shoe (as shown in Fig. 5) despite the tendency of the snail cam 36 to press it back against the shoe. When the brake is released however, the springs 15 will overpower the leaf springs 125, and the clearance occasioned by their deflection into contact with the ends of the shoes will be sufficient to permit the shoes to move into the off position.

In the arrangement shown in Fig. 5 the two rollers 23 on each carrier, which serve to support the adjacent ends of the two shoes, are mounted on opposite ends of a link 39 which can float relatively to the carrier on a central pivot 40. With this arrangement an equal outward thrust will be applied to the adjacent ends 25, 25ª of each pair of shoes 19, 19ª when the carriers are moved outwards, thereby further equalising the braking pressure between the shoes and the drum.

It will be understood that the carriers need not necessarily be mounted on pivots as illustrated, but that the brake adjuster may be replaced by a second expander, the two expanders acting to force the carriers bodily apart to apply the brakes as described in Patent No. 2,271,815.

What I claim as my invention and desire to secure by Letters Patent is:

1. A self-energizing internally expanding brake assembly, comprising a brake drum, a pair of brake-shoe-carriers mounted upon a fixed part of the assembly within the drum, means for retaining the carriers in an inoperative position, an expander for moving the carriers outwardly to apply the brake, at least one brake shoe mounted on each carrier for limited circumferential movement in relation thereto, brake linings on the brake shoes, stop means on said fixed part operative, on circumferential movement of the shoes when contacted by the revolving brake drum, to arrest the shoes and thereby apply an increased braking pressure, and an automatic slack adjuster, constituted by a wedge member carried by said fixed part adjacent the trailing end of a shoe as referred to the movement of the brake drum, and a spring for moving said wedge member progressively forwards and nearer said trailing end, as the linings wear, to take up the resulting clearance.

2. A self-energizing internally expanding brake, comprising a brake drum, a pair of brake-shoe-carriers mounted within the drum, means for retaining the carriers in an inoperative position, an expander for moving the carriers outwardly to apply the brake, at least one brake shoe mounted on each carrier for limited circumferential movement in relation thereto, brake linings on the brake shoes, two diametrically opposite stops operative, on circumferential movement of the shoes when contacted by the revolving brake drum, to arrest the shoes and thereby apply an increased braking pressure, a wedge member mounted adjacent the leading side only of each stop as referred to the movement of said brake drum, and springs for feeding the wedge members progressively forward, as the linings wear, to increase the effective width of the stops by adding increments to its leading side only.

3. A brake as claimed in claim 2, in which the forward end of each wedge is of stepped formation, the steps being arranged to come successively into position between the associated stop and brake shoe as the linings wear.

4. A self-energizing internally expanding brake, comprising a brake drum, a pair of brake-shoe-carriers mounted within the drum, means for retaining the carriers in an inoperative position, an expander for moving the carriers outwardly to apply the brake, a pair of brake shoes mounted on each carrier for limited circumferential movement in relation thereto one of the shoes of each pair being a leading shoe and the other a trailing shoe as referred to the movement of said brake drum, the leading shoe on each carrier abutting the trailing end of the trailing shoe of the other carrier, a brake lining on each of the brake shoes, a stop located between the two brake shoes on each carrier, said stops operating, on circumferential movement of the shoes when contacted by the revolving brake drum, to be contacted by the respective trailing shoes and serving to arrest the shoes and thereby apply an increased braking pressure, a wedge member mounted adjacent the leading edge of each stop, and springs for feeding the wedge members progressively forward in the direction toward the trailing end of the leading shoe, as the linings wear, to increase the effective width of the stops.

5. A self-energizing internally expanding brake, comprising a brake drum, a pair of brake-shoe-carriers mounted within the drum, means for retaining the carriers in an inoperative position, an expander for moving the carriers outwardly to apply the brake, at least one brake shoe mounted on each carrier for limited circumferential movement in relation thereto, brake linings on the brake shoes, two diametrically opposite stops operative, on circumferential movement of the shoes when contacted by the revolving brake drum, to arrest the shoes and thereby apply an increased braking pressure, a snail cam forming part of each stop, and springs operating, as the linings wear, to turn the cams in the direction to increase the effective width of the stops at the leading ends thereof as referred to the movement of the brake drum and so take up the resulting clearance.

6. A self-energizing internally expanding brake, comprising a brake drum, a pair of brake-shoe-carriers mounted within the drum, means for retaining the carriers in an inoperative position, an expander for moving the carriers outwardly to apply the brake, a pair of brake shoes mounted on each carrier for limited circumferential movement in relation thereto, a brake lining on each of the brake shoes, a stop located between the two brake shoes on each carrier, said stops operating, on circumferential movement of the shoes when contacted by the revolving brake drum, to arrest the shoes and thereby apply an increased braking pressure and comprising rotatably mounted snail cams, and springs operating to turn the cams in the direction to increase the effective width of the stops at the leading ends thereof as referred to the movement of the brake drum and so to take up the clearance occasioned by wear of the linings.

FREDERICK RAYMOND COWELL.